US012627713B2

(12) United States Patent
Ankaiah et al.

(10) Patent No.: US 12,627,713 B2
(45) Date of Patent: May 12, 2026

(54) SECURE SERVICE ADVERTISEMENT IN MULTICAST DNS

(71) Applicant: Cambium Networks Ltd, Ashburton (GB)

(72) Inventors: Shashi Hosakere Ankaiah, Bangalore (IN); Trevor Miranda, San Francisco, CA (US); Vivek Lakshminarayana Atreya, Bangalore (IN)

(73) Assignee: Cambium Networks Ltd, Ashburton (GB)

( * ) Notice: Subject to any disclaimer, the term of this patent is extended or adjusted under 35 U.S.C. 154(b) by 124 days.

(21) Appl. No.: 18/510,229

(22) Filed: Nov. 15, 2023

(65) Prior Publication Data

US 2024/0380786 A1 Nov. 14, 2024

(30) Foreign Application Priority Data

May 9, 2023 (IN) .............................. 202341032655

(51) Int. Cl.
*H04L 9/40* (2022.01)

(52) U.S. Cl.
CPC .......... *H04L 63/20* (2013.01); *H04L 63/1425* (2013.01)

(58) Field of Classification Search
CPC ............................ H04L 63/20; H04L 63/1425
See application file for complete search history.

(56) References Cited

U.S. PATENT DOCUMENTS

| | | | | |
|---|---|---|---|---|
| 9,319,856 | B1 * | 4/2016 | Riggs | H04N 21/64753 |
| 10,496,801 | B2 * | 12/2019 | Hamlin | H04L 63/08 |
| 11,122,040 | B1 | 9/2021 | Sun et al. | |
| 2014/0379911 | A1 * | 12/2014 | Fayssal | H04W 12/065 |
| | | | | 709/225 |
| 2021/0058394 | A1 | 2/2021 | Zhang et al. | |
| 2021/0203521 | A1 | 7/2021 | Konda et al. | |
| 2022/0303805 | A1 | 9/2022 | Raghuramu et al. | |

OTHER PUBLICATIONS

Extended European Search Report for EP Application No. 24175041.3 dated Jul. 9, 2024 (10 pp.).

* cited by examiner

*Primary Examiner* — Vance M Little
(74) *Attorney, Agent, or Firm* — Crowell & Moring LLP

(57) ABSTRACT

A method for a network device is provided, the method comprising obtaining device fingerprint data representing a first set of characteristics of a device connected to the network and an associated confidence score representative of a confidence in the first set of characteristics, obtaining a threshold confidence score, receiving a service advertisement message from the device, the service advertisement message including an indication of a second set of characteristics of the device. The method then involves determining whether the first set of characteristics are inconsistent with the second set of characteristics and performing a predetermined action in dependence on an outcome of this determining and on a comparison of the confidence score with the threshold confidence score. A network device configured to perform the method, and a non-transitory computer-readable storage medium comprising instructions for executing the method are also provided.

18 Claims, 8 Drawing Sheets

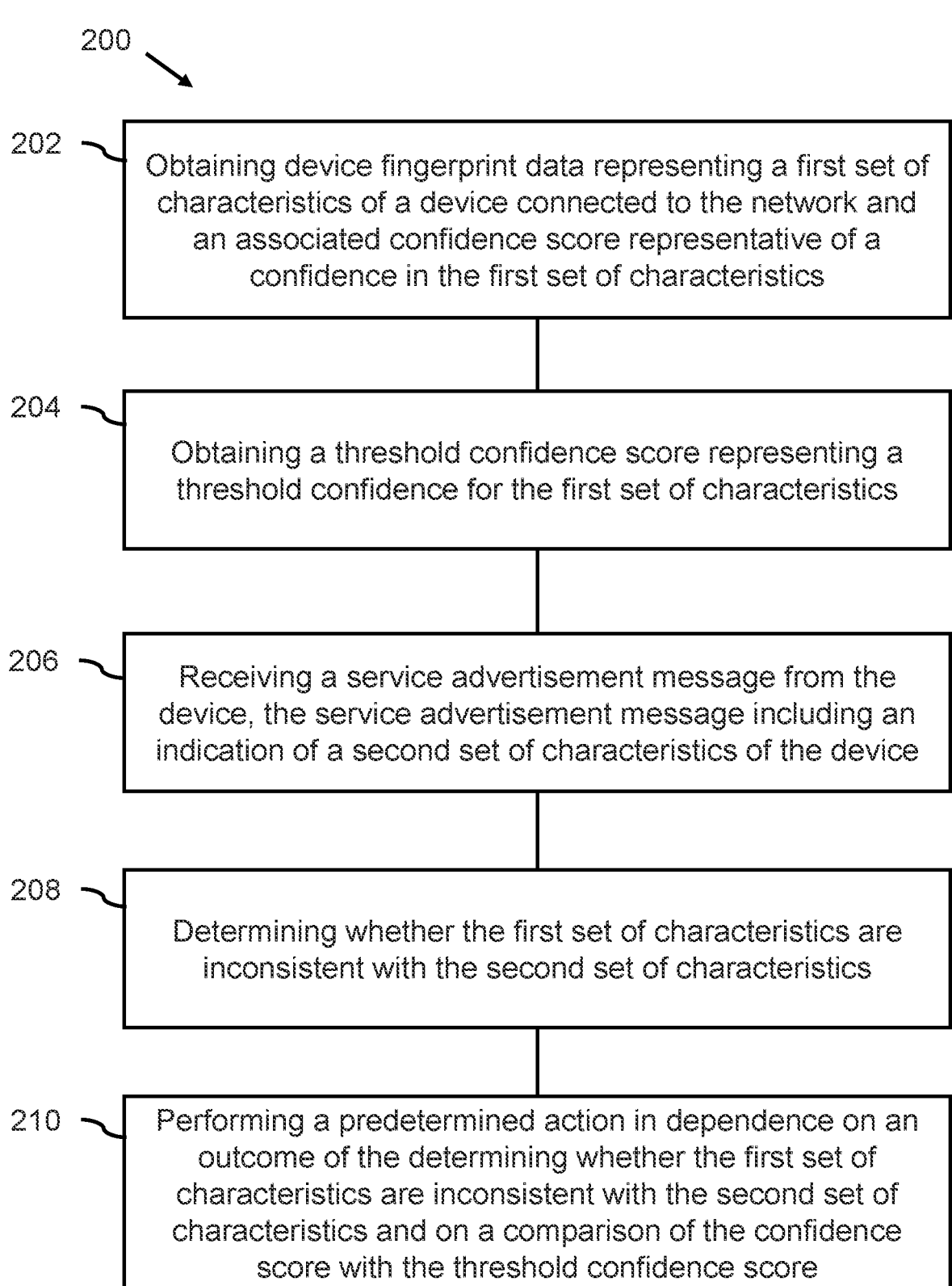

200

202 — Obtaining device fingerprint data representing a first set of characteristics of a device connected to the network and an associated confidence score representative of a confidence in the first set of characteristics 204 — Obtaining a threshold confidence score representing a threshold confidence for the first set of characteristics 206 — Receiving a service advertisement message from the device, the service advertisement message including an indication of a second set of characteristics of the device 208 — Determining whether the first set of characteristics are inconsistent with the second set of characteristics 210 — Performing a predetermined action in dependence on an outcome of the determining whether the first set of characteristics are inconsistent with the second set of characteristics and on a comparison of the confidence score with the threshold confidence score

*FIG. 2*

| Device Ref | ID | Device | Type | OS | Score |
|---|---|---|---|---|---|
| 302A | A | Laser Jet | Printer | Android | 80 |
| 310A | B | Macbook | Laptop | - | 75 |
| 308A | C | UHD TV | - | AndroidTV | 50 |
| 304A | D | - | Smart-phone | Smartphone OS | 70 |
| 306A | E | Multicore Workstation | Desktop PC | - | 65 |
| 312A | F | - | - | Windows Server | 90 |
| ... | ... | ... | ... | ... | ... |

402    404    110

100A
104

Threshold Confidence Score: 60    112

502

| ID | Device | Type | OS | Services |
|----|--------|------|-----|----------|
| A | Router | WAN Access Point | Android | • Internet Access point<br>• Authentication Services |

} 504

506

| ID | Device | Type | OS | Services |
|----|--------|------|-----|----------|
| B | Macbook | Laptop | - | • Authentication<br>• Hotspot |

508

| ID | Device | Type | OS | Services |
|----|--------|------|-----|----------|
| C | UHD TV | - | AndroidTV | • Video Casting<br>• Wireless Remote |

*FIG. 5*

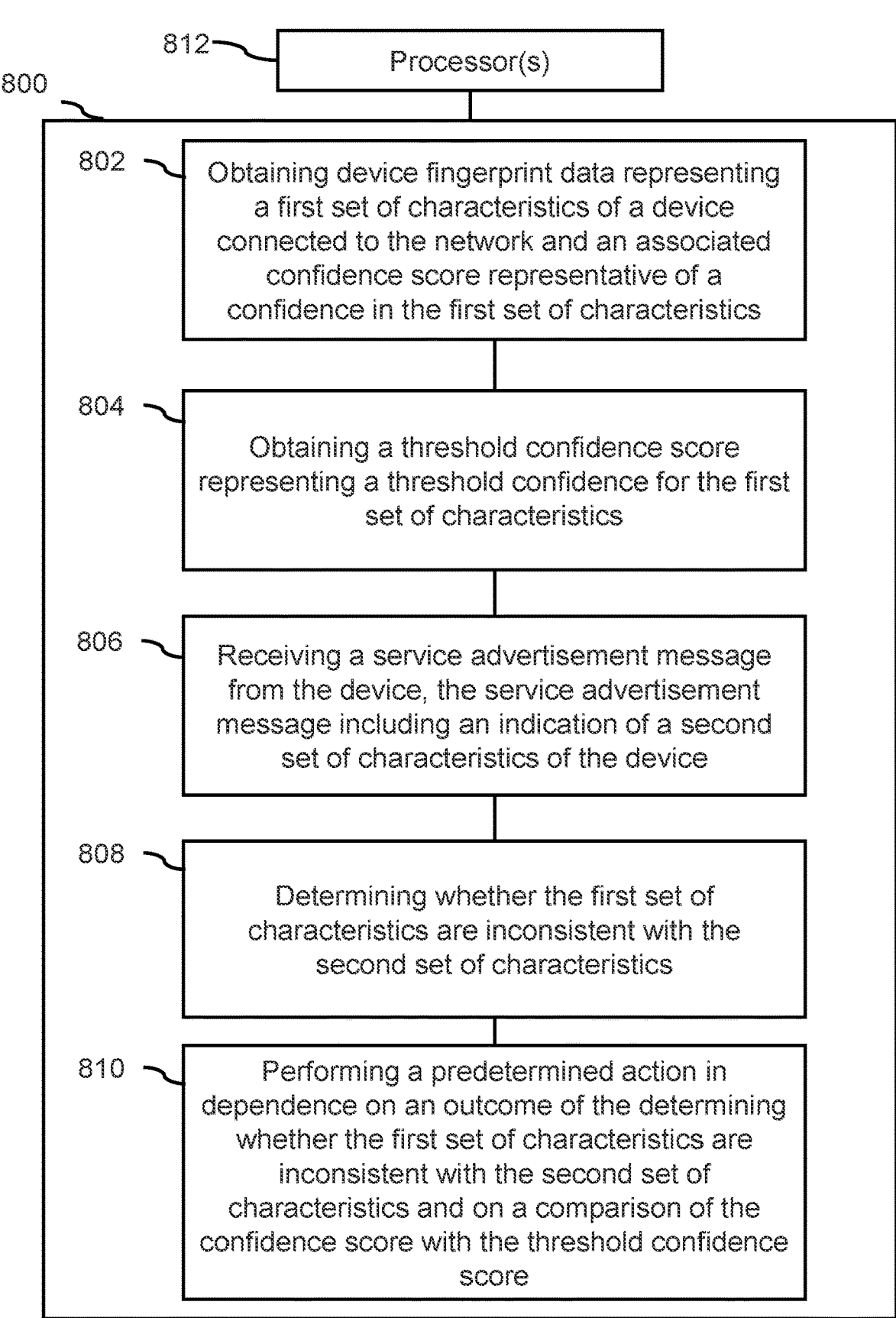

812 — Processor(s)

800

802 — Obtaining device fingerprint data representing a first set of characteristics of a device connected to the network and an associated confidence score representative of a confidence in the first set of characteristics 804 — Obtaining a threshold confidence score representing a threshold confidence for the first set of characteristics 806 — Receiving a service advertisement message from the device, the service advertisement message including an indication of a second set of characteristics of the device 808 — Determining whether the first set of characteristics are inconsistent with the second set of characteristics 810 — Performing a predetermined action in dependence on an outcome of the determining whether the first set of characteristics are inconsistent with the second set of characteristics and on a comparison of the confidence score with the threshold confidence score

*FIG. 8*

SECURE SERVICE ADVERTISEMENT IN MULTICAST DNS

CROSS-REFERENCE TO RELATED APPLICATION

This application claims priority to India Patent Application No. 202341032655 filed on May 9, 2023, the entirety of which is hereby fully incorporated by reference herein.

BACKGROUND OF THE INVENTION

Field of the Invention

This application relates to network security and more specifically, though not exclusively, service discovery in multicast DNS enabled networks.

Description of the Related Technology

Multicast Domain Name System (mDNS) is a protocol that enables devices on a network to discover and communicate with each other using domain names without the need for a centralized DNS server. It is based on the DNS protocol, but instead of using a traditional DNS server to resolve domain names to IP addresses, mDNS uses multicast DNS messages to enable devices to discover each other.

When a device running mDNS joins a network, it sends out a multicast DNS message to announce its presence and provide information about the services it offers. Other devices on the network can then discover the device by sending out multicast DNS queries using the device's domain name. If the device is available, it responds to the query with its IP address and any other information requested.

A consequence of mDNS is that it enables automatic discovery of devices and services on a network without need for manual configuration or a dedicated DNS server. mDNS protocol is part of a set of technologies typically referred to as "Zero-Configuration Networking", often abbreviated to "zerconf". This makes it especially useful for home networks and office networks where setting up and maintaining a DNS server may not be practical or necessary.

There are security concerns around the use of mDNS protocols, primarily related to the potential for unauthorized devices to join a network and potentially launch attacks or compromise network security. Identifying and acting against unauthorized devices can be particularly difficult in large networks, such as across enterprises.

It is desirable to address some of the security concerns of mDNS protocol enabled networks.

SUMMARY

In accordance with a first aspect of the present disclosure there is provided a computer-implemented method for controlling a network, the method comprising; obtaining device fingerprint data representing a first set of characteristics of a device connected to the network and an associated confidence score representative of a confidence in the first set of characteristics; obtaining a threshold confidence score representing a threshold confidence for the first set of characteristics; receiving a service advertisement message from the device, the service advertisement message including an indication of a second set of characteristics of the device; determining whether the first set of characteristics are inconsistent with the second set of characteristics; and performing a predetermined action in dependence on an outcome of the determining whether the first set of characteristics are inconsistent with the second set of characteristics and on a comparison of the confidence score with the threshold confidence score.

By configuring a network device to handle service advertisement messages based on both a determination of whether the advertising device is advertising characteristics that are inconsistent with the characteristics known by the network device, and a comparison of a confidence score with a threshold confidence score, the accuracy of identifying and protecting against fraudulent service advertisement messages may be increased. It is desirable to reject service advertisement messages from devices if they are advertising characteristics that are inconsistent with determined characteristics, as this is often exhibited when malicious devices are spoofing legitimate devices. However, it has been found that by basing the actions additionally on a comparison of a confidence score, it is possible to mitigate the rejection of service advertisement messages from legitimate devices where the characteristics described in the fingerprint data are not accurate, or where there is low confidence in those characteristics.

The predetermined action may include: forwarding the service advertisement message into the network; or rejecting the service advertisement message to prevent the service advertisement message from being distributed in the network.

In this way it is possible to protect other user devices from fraudulent or malicious service advertisement messages, while also allowing legitimate devices to advertise their services in the network.

Forwarding the service advertisement message into the network may be dependent on at least one of the following conditions being met: (i) the first set of characteristics are consistent with the second set of characteristics and the confidence score represented in the fingerprint data does not exceed the threshold confidence score; (ii) the first set of characteristics are consistent with the second set of characteristics and the confidence score represented in the fingerprint data exceeds the threshold confidence score; and (iii) the first set of characteristics are inconsistent with the second set of characteristics and the confidence score represented in the fingerprint data does not exceed the threshold confidence score.

In this way, devices which advertise characteristics that are consistent with determined characteristics in the fingerprint data are able to advertise their services, for example, using protocols such as mDNS, in the network. Additionally, devices for which fingerprint data may not be wholly accurate, may be able to broadcast their service advertisement messages.

Forwarding the service advertisement message when the first set of characteristics are inconsistent with the second set of characteristics and the confidence score does not exceed the threshold confidence score may be subject to administrator approval.

Subjecting these decisions to administrator approval means that for those edge cases in which it may be difficult to accurately determine whether the service advertisement messages should be forwarded into the network, it is possible for oversight and accountability to be maintained.

Rejecting the service advertisement message may be performed in response to a determination that the first set of characteristics are inconsistent with the second set of characteristics and the confidence score represented in the fingerprint data exceeds the threshold score.

In this way, where there is confidence that the device broadcasting their services is misrepresenting their characteristic, as is often done by malicious devices, it becomes possible to protect other devices in the network from providing sensitive data to said device.

Obtaining the fingerprint data may include receiving the fingerprint data from a further device attached to the network that is configured to generate the fingerprint data.

In this way, the fingerprint data may be provided to all network access point or edge devices such that the method may be applied to all devices connected to the network. Additionally, generating the fingerprint data from a further device, or further network device, reduces the workload of each of the other network devices acting as access points to the network.

Obtaining the fingerprint data may include generating the fingerprint data.

In this way, a network device that applies the method to protect the other devices in the network from malicious devices may also be able to generate the fingerprint data by monitoring communications in the network 300.

Generating the fingerprint data may include deriving the first set of characteristics from one or more messages received from the device, and the method may include at least one of: (i) performing passive scans of devices attached to the network to obtain messages from said devices; and (ii) performing active scans of devices attached to the network to obtain messages from said devices.

Performing passive scans of the devices attached to the network allows the method to continually improve on the fingerprint data and react in time to changes in the network conditions such as the addition of new devices or the removal of devices from the network.

The confidence score may be determined based on at least one of: (i) an amount of data received in messages from the device that are used to derive the first set of characteristics; (ii) a number of messages used to derive the first set of characteristics; (iii) whether the first set of characteristics are inferred from the messages or explicitly signaled in the messages; (iv) a number of characteristics included in the first set of characteristics; and (v) the type of messages received from the device.

By monitoring the quantity, quality, and contents of messages received and transmitted from the device it is possible to build up the first set of characteristics. Legitimate devices in the network are expected to behave in certain ways and by monitoring the activity of a device it can be possible to identify characteristics of these devices.

The first and second set of characteristics may each include at least one of: (i) a device type; (ii) an operating system; (iii) an indication of software running on the device; (iv) a device model; (v) an identification number associated with the device; and (vi) an indication of services provided by the device.

These characteristics provide efficient, and dependable ways of identifying a device and which offer characteristics that do not easily change and hence can be compared over time.

Determining whether there are inconsistencies between the first set of characteristics and the second set of characteristics may comprise comparing a first characteristic of the first set of characteristics, the first characteristic corresponding to a first characteristic type, with a second characteristic of the second set of characteristics, the second characteristic corresponding to the first characteristic type.

Comparing characteristics of the same type enables the method to be applied uniformly and accurately to all devices and can ensure that small variations or inconsistencies which might otherwise go undetected can be determined.

Determining whether there are inconsistencies between the first set of characteristics and the second set of characteristics may comprise comparing a first characteristic of the first set of characteristics, the first characteristic corresponding to a first characteristic type, with a second characteristic of the second set of characteristics, the second characteristic corresponding to a second, different, characteristic type.

Comparing characteristics of different types enables the method to be applied even in circumstances in which the fingerprint data does not have a complete set of characteristics for each device, or where there is a variation in the characteristic types described in the second set of characteristics.

According to a second aspect of the present disclosure there is provided a network device configured to act as an access point for devices to connect to a network, the network device comprising a processor and storage, the storage comprising computer-executable instructions which, when executed by the processor, cause the network device to: (i) obtain device fingerprint data representing a first set of characteristics of a device connected to the network and an associated confidence score representative of a confidence in the first set of characteristics; (ii) obtain a threshold confidence score representing a threshold confidence for the first set of characteristics; (iii) receive a service advertisement message from the device, the service advertisement message including an indication of a second set of characteristics of the device; (iv) determine whether the first set of characteristics are inconsistent with the second set of characteristics; and (v) perform a predetermined action in dependence on an outcome of the determining whether the first set of characteristics are inconsistent with the second set of characteristics and on a comparison of the confidence score with the threshold confidence score.

According to a third aspect of the present disclosure there is provided a non-transitory computer-readable storage medium comprising computer-executable instructions which, when executed by a processor, cause the processor to: (i) obtain device fingerprint data representing a first set of characteristics of a device connected to the network and an associated confidence score representative of a confidence in the first set of characteristics; (ii) obtain a threshold confidence score representing a threshold confidence for the first set of characteristics; (iii) receive a service advertisement message from the device, the service advertisement message including an indication of a second set of characteristics of the device; (iv) determine whether the first set of characteristics are inconsistent with the second set of characteristics; and (v) perform a predetermined action in dependence on an outcome of the determining whether the first set of characteristics are inconsistent with the second set of characteristics and on a comparison of the confidence score with the threshold confidence score

BRIEF DESCRIPTION OF THE DRAWINGS

In order that the present invention may be more readily understood, examples of the invention will now be described, with reference to the accompanying drawings, in which:

FIG. 2 is a flow chart showing a method for the network device according to examples;

FIG. 5 is a schematic diagram showing a service advertisement message according to examples;

FIG. 8 is a schematic diagram showing an example of a non-transitory computer-readable storage medium according to examples.

DETAILED DESCRIPTION

Figure 1:
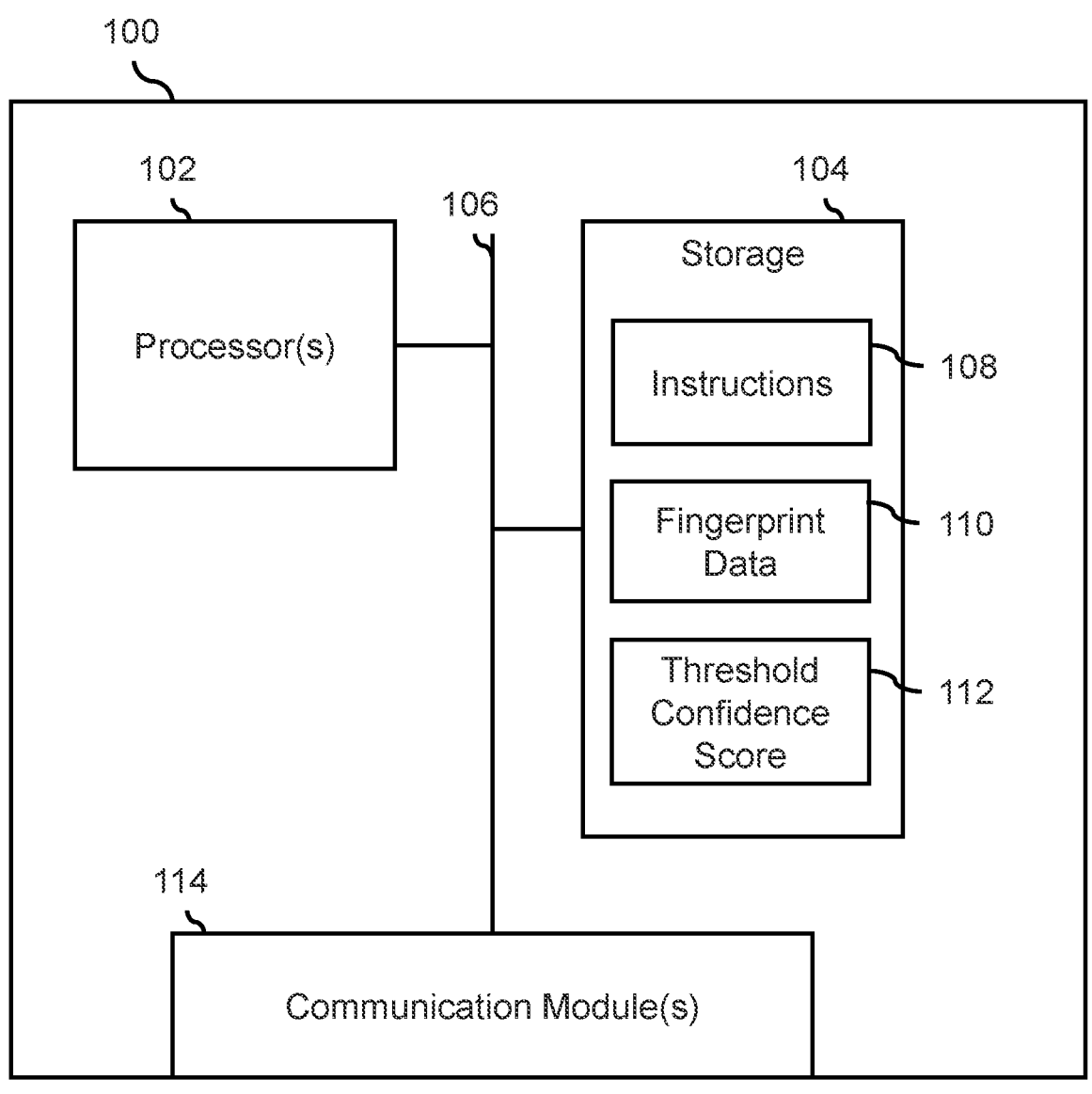
FIG. 1 is a schematic diagram showing a network device according to examples.

Computer networks are fundamental to modern computing infrastructure and are widely used in businesses, schools, and homes. Networks can be configured in a variety of ways, some of which require greater computational and administrative burden than others. Certain protocols, such as mDNS, are often favored in networks where reduced administration is desired, particularly where setting up and maintaining a DNS server may not be practical or necessary.

One of the security risks associated with mDNS is the possibility of "spoofing" or "hijacking" the identity of a legitimate device on the network. This can happen if an attacker sends out mDNS packets with a forged IP address or hostname that matches that of a legitimate device, tricking other devices on the network into thinking that the attacker's device is legitimate. Once the attacker gains access to the network, they may be able to launch attacks or steal sensitive information. For example, an attacker may advertise their machine as a printer on the network and offer printing services to other computers. An unsuspecting user may select the attacker's machine and send a document, including sensitive information, to the attacker's machine under the assumption that it will print the document. The attacker's machine could additionally forward this information to a legitimate printer on the network such that the user is unaware of the breach of sensitive information. Aside from "spoofing", attackers may configure their machines to appear as different, legitimate machines. On larger networks, illegitimate machines may blend in amongst the high number of other devices, and hence go undetected.

To mitigate these security risks, some secure versions of mDNS protocols, such as DNSSEC (DNS Security Extensions), are available which provide cryptographic authentication of DNS responses, or mDNS-over-TLS (Transport Layer Security), which encrypts mDNS packets to prevent eavesdropping and tampering. However, these methods are not always fully secure against spoofing, and it is desirable to increase the protection provided in the network. Additionally, these protocols increase the security burden for legitimate machines in the network.

Certain examples described herein provide methods and network devices which are designed to address these security risks by evaluating the identities of devices in the network and intercepting service advertisement messages. If service advertisement messages are determined to be fraudulent, or do not meet security constraints, then these service advertisement messages can be rejected before being transmitted to other devices in the network.

Service advertisement messages are messages in which a device broadcasts its identity and capabilities to other devices in the network. For example, a printer may send a service advertisement message, in the form of an mDNS message, that includes an indication of its IP address, hostname, and services it provides such as printing, scanning, network connection throughput, authentication services, file access, program operation, and so forth. Different devices are generally associated with different services.

FIG. 1 shows an example of a network device 100 configured to act as an access point for devices to connect to a network. The network device 100 comprises one or more processors 102, and storage 104 connected over a communications channel 106, such as a bus. The storage 104 is suitable for storing a set of computer-executable instructions 108 for executing a method 200, which will be described further below with respect to FIGS. 2 to 7. The storage 104 may also be suitable for storing other types of data such as fingerprint data 110 and a threshold confidence score 112. The storage 104 may include any combination of volatile and non-volatile storage, for example, a combination of read-only memory (ROM) and one or more types of random-access memory (RAM), such as dynamic RAM, synchronous RAM, and so forth. ROM may be included in the form of both disc-based (e.g. hard drive) or flash memory (e.g. solid state drive(s)). The processor(s) 102 may include any suitable combination of processing circuitry configured to execute the instructions 108. The processor(s) 102 may include one or more general purpose processors, such as central processing units (CPU), and/or application specific processing circuitry or processing units. The network device 100 may additionally include one or more communications modules 114 configured to enable communication with one or more further computing devices, for example, as part of a network. The communications module(s) 114 may comprise wireless and/or wired communications modules to enable at least one of wired LAN and wireless LAN connectivity. These communications modules 114 may implement known protocols and standards such as Wi-Fi, Bluetooth, Ethernet, and so forth. The network device 100 may be capable of communicating over both local and wide area networks via the communications module(s) 114.

Figure 3:
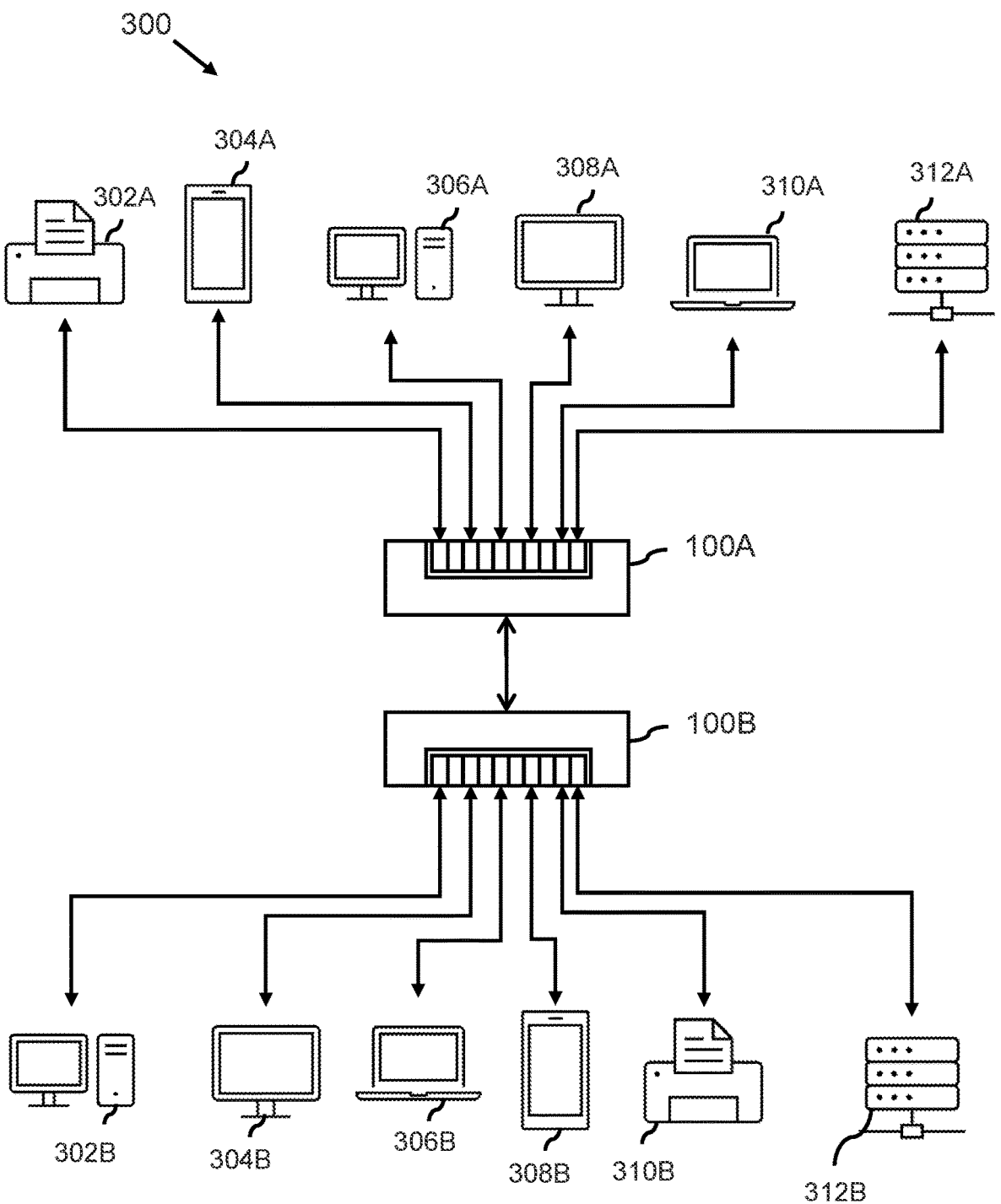
FIG. 3 is schematic diagram showing a local area network in which the network device may be deployed according to examples.

Turning briefly to FIG. 3 an example of a network 300 in which two such network devices 100, each labelled with a different suffix 'A' and 'B', are shown. The network 300 is a local area network such as that which may be deployed in a home or office environment to enable network computing functions such as file transfer, printing, and so forth. The network devices 100A and 100B enable communication between a plurality of different computing devices 302A to 312A and 302B to 312B. These computing devices 302A to 312A and 302B to 312B may also be referred to as user devices, or simply devices, though it will be appreciated that these devices may not be associated with specific users. A distinction is drawn between the network devices 100A and 100B which operate to enable communication in the network, and the user devices 302A to 312A and 302B to 312B which utilize the network capabilities to communication amongst each other.

In the example shown in FIG. 3, a plurality of device types is shown including printers 302A and 312B, smartphones 304A and 308B, laptop computers 310A and 306B, desktop computers 306A and 302B, smart televisions 308A and 304B, and servers 312A and 312B. The devices shown in FIG. 3 and connected to the network 300 are provided as examples only and it is to be appreciated that a variety of communications enabled computing devices not shown may also be connected to the network 300.

The network devices 100A and 100B are communicatively coupled to allow communication between the first set of devices 302A to 312A connected to the first network device 100A and the second set of devices 302B to 312B connected to the second network device 100B. The network devices 100A and 100B may implement any of a number of network functions for managing the devices 302A to 312A and 302B to 312B including authentication, bandwidth distribution, message forwarding, and switching. The network devices 100A and 100B may be the same type of network devices 100 such as wireless access points, though in some cases, the network devices 100A and 100B may be different examples of network devices which include different functionality. For example, one of the network devices 100A may be a network edge device and include the capability to enable communication into and out of a wide area network, such as the internet, while the other network device 100B may be local access point for connecting devices located within a specific geographic location to connect to the network 300.

As mentioned above, the storage 104 includes instructions 108 in the network device for performing a method 200 for controlling a network, shown in the flow chart of FIG. 2. The method 200 will now be described with respect to FIGS. 2 to 7. The method 200 includes obtaining 202 device fingerprint data 110, shown in FIG. 4, representing a first set of characteristics of a device 302A connected to a network 300 and an associated confidence score that is representative of a confidence in the first set of characteristics.

In a first example, obtaining the fingerprint data 110 involves receiving the fingerprint data 110 from another network device connected to the network 300. The network 300 may include a network device that is configured to generate the fingerprint data 110 relating to the user devices 302A to 312B connected to the network. In this case, the network device 100 may receive the fingerprint data 110 using the communication module(s).

Figure 4:
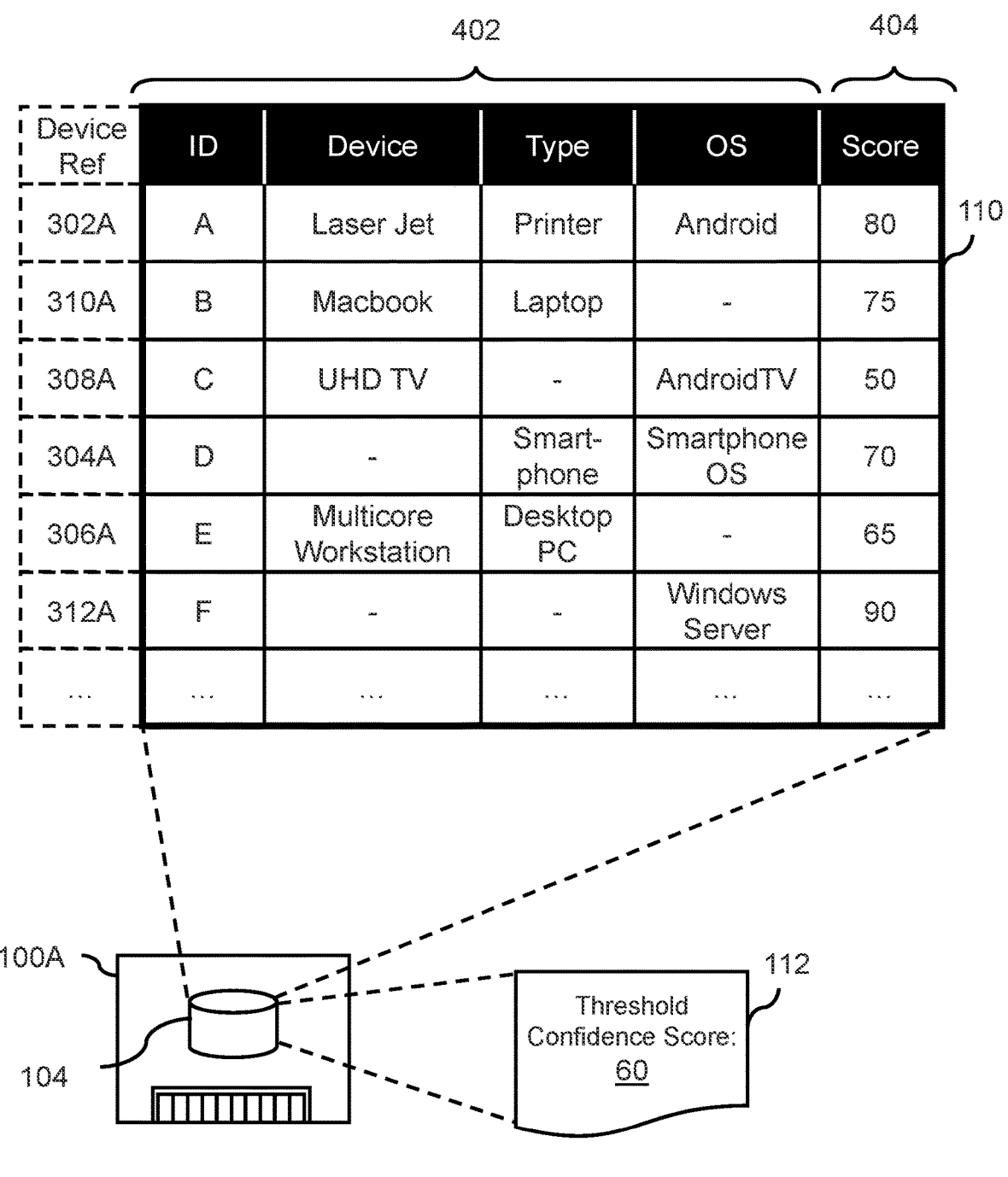
FIG. 4 is schematic diagram showing fingerprint data and a threshold confidence score according to examples.

In the example of FIG. 4 in which fingerprint data 100 is shown, a plurality of first sets of characteristics 402 are included, where each first set of characteristics 402 is associated with a corresponding device in the network 300. These first sets of characteristics 402 shown in FIG. 4 include several different characteristic types including a device identifier (ID), such as an identification number or string, a device model, a device type, and an operating system being implemented by the respective device. While not shown in FIG. 4, it will be appreciated that the first set of characteristics 402 may additionally, or alternatively, include other characteristic types such as an indication of services provided by the device, and an indication of software running on the device. The characteristics for each device included in the fingerprint data 110 may not include the same types of characteristics for each device 302A to 312A. For example, in the fingerprint data shown in FIG. 4, the first set of characteristics associated with a first device 302A includes an ID, device model, device type, and an operating system (OS) while a first set of characteristics for a second device 308A includes an ID, device model, OS, but no device type. The characteristics that are included for each device in the fingerprint data 110 will depend on the way in which the fingerprint data is generated, which will be discussed further below with respect to FIG. 7.

The confidence scores 404 each represent a confidence in the first set of characteristics 402 for a respective device. These confidence scores 404 may be indicative of how certain the network device 100 is about the characteristics 402. The first set of characteristics 402 may be determined according to a variety of protocols, and hence the confidence in the first set of characteristics 403 may not be uniform for all devices and may depend on several factors. Examples of generating the confidence score will be discussed further below.

A threshold confidence score 112 representing a threshold confidence 112 for the first set of characteristics is also obtained 204. Obtaining the threshold confidence score 112 may involve receiving, or generating, the score 112 based on user input to the device 100 or from an external control device via the communication module(s) 114. The threshold confidence score 112 may be stored in the storage 104 to be accessed when it is to be used.

A service advertisement message 502, shown in FIG. 5, is received 206 from the device 302A, the service advertisement message 502 including an indication of a second set of characteristics 504 of the device 302A. As described above, a service advertisement message may include characteristics of a device 302A that is providing the advertisement, and an indication of services provided by the device 302A. In the example shown, the service advertisement message 502 is received from a first user device 302A. The device 302A connected to the network 300 may attempt to broadcast a service advertisement using mDNS, wherein this message is initially received by the network device 100 acting as an entry point into the network 300 for the device 302A. Additional examples of service advertisement messages 506 and 508 that may be received from other devices 310A and 308A are also shown in FIG. 5.

In the example shown in FIG. 5, the second set of characteristics 504 include an identification number (ID) associated with the device, a device model, a device type, an operating system, and an indication of one or more services being offered by the device 302A to other devices 302A to 312B connected to the network 300. It will be appreciated that other characteristics, beyond those shown FIG. 5, may also be included in the second set of characteristics, including an IP address, a domain name, an indication of software running on the device, port information corresponding to the device 302A, and so forth. Generally service advertisement messages 502 provide the second set of characteristics such that other devices 304A to 312B in the network 300 are able to identify which devices provide services that the devices 304A to 312B would like to use, and then to address requests for service to the device 302A providing said services.

Figure 6:
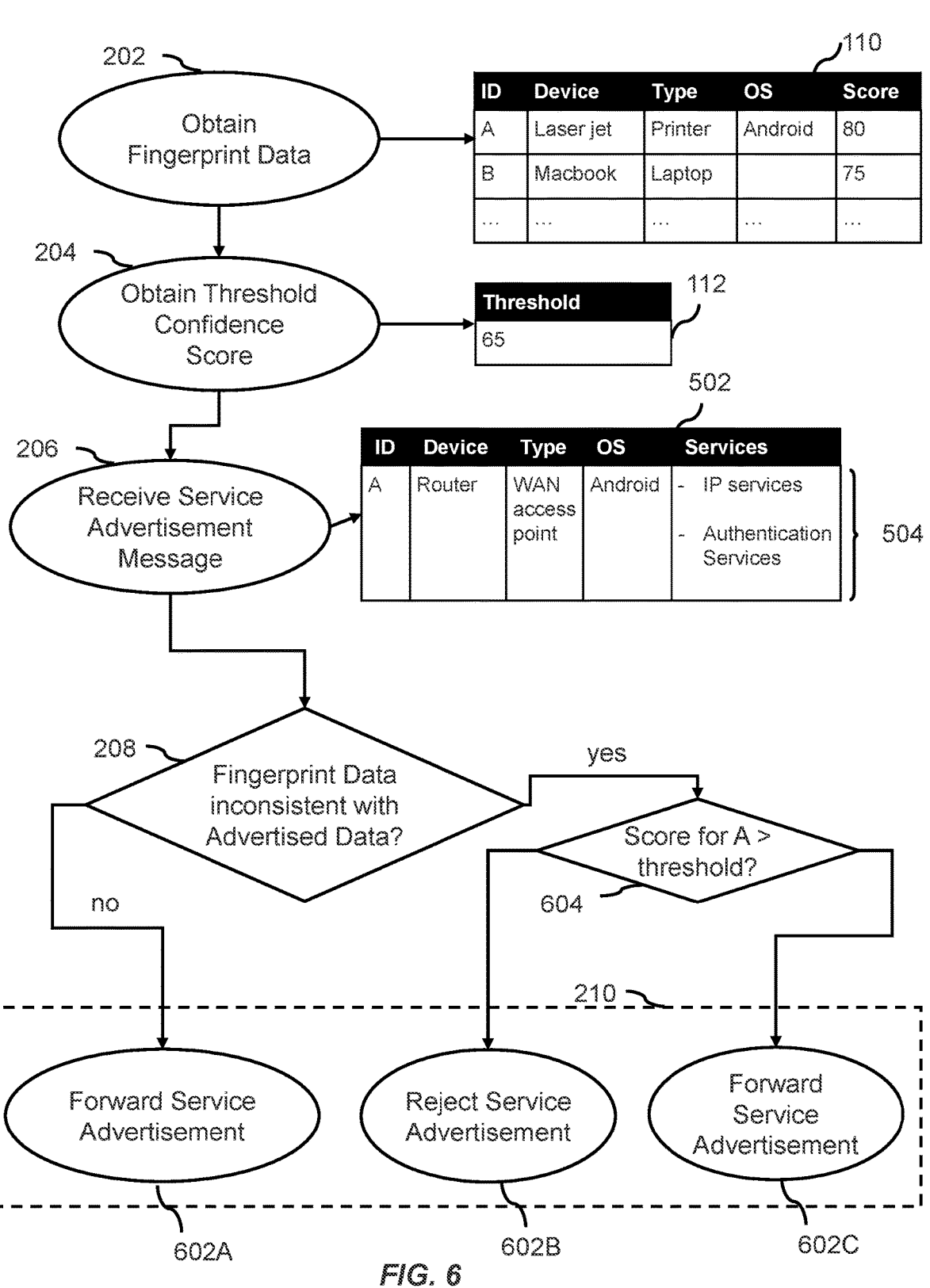
FIG. 6 is a schematic diagram showing the method for the network devices according to examples.

Turning now to FIG. 6, the steps of the method 200 following the receipt of the service advertisement message 502 are illustrated. As seen in FIG. 6, the method 200 includes determining 208 whether the first set of characteristics 402 are consistent with the second set of characteristics 504. A predetermined action 602A to 602C is performed 210 in dependence on an outcome of the determining 208 whether the first set of characteristics 402 are inconsistent with the second set of characteristics 504 and on a comparison 604 of the confidence score with the threshold confidence score 112. In this way, the network device 100 is able to process the service advertisement message 502 based on whether the service advertisement message 502 is suspicious and to modify this response based on a confidence of the known device characteristics.

While the fingerprint data 110 represents characteristics of the device 302A, there is not a guarantee that these characteristics are completely accurate. The first set of characteristics 402 may be determined based on a number of methods such as passive scans, including intercepting or listening to messages from the device 302A, or active scans, which involve probing the device 302A, to determine characteristics of the device 302A. In some cases, the network device 100 may be able to determine, with a high confidence level, the characteristics of the device 302A. However, in other examples, limited information may be available to determine the characteristics of the device 302A and/or only a small number of characteristics may be determined. It has been found that strictly denying, or rejecting, service advertisement messages 502 from all devices based on inconsistency between the second set of characteristics 504 and the first set of characteristics 402 can lead to the rejection of advertisement messages 502 from legitimate devices. By obtaining a confidence score 404 for the first set of characteristics 402 of a device 302A, and basing a predetermined action on a comparison of this score 404 to the threshold 112, it is possible to more accurately identify fraudulent, or malicious, service advertisement messages 502 while mitigating a mis-categorization of legitimate service advertisement messages 502 as fraudulent.

The predetermined action 602A to 602C may include forwarding the service advertisement message into the network 602A and 602C, or rejecting the service advertisement message 502 to prevent the service advertisement message 502 from being distributed in the network 300. As discussed previously, the network device 100 may act as an entry point for the communications from devices 302A to 312B into the network 300, and by rejecting or accepting, e.g. forwarding, the services advertisement message 502 the network device 100 is able to control whether other devices in the network receive the service advertisement message 502.

The service advertisement message 502 may be forwarded into the network 300 dependent on at least one of the following conditions being met: (i) the first set of characteristics 402 are consistent with the second set of characteristics 504 and the confidence score 404 represented in the fingerprint data 110 does not exceed the threshold confidence score 112, (ii) the first set of characteristics 402 are consistent with the second set of characteristics 504 and the confidence score 404 represented in the fingerprint data 110 exceeds the threshold confidence score 112, and (iii) the first set of characteristics 402 are inconsistent with the second set of characteristics 504 and the confidence score 404 represented in the fingerprint data 110 does not exceed the threshold confidence score 112. Where there are inconsistencies between the first 402 and second 504 sets of characteristics but the confidence score 404 is below the threshold confidence score 112, the message 502 may be forwarded into the network 300 as although the device 302A is advertising different characteristics than those expected from the first set of characteristics 402, the network device 100 has low confidence in the first set of characteristics 402 and hence forwarding the message 502 does not represent a high risk and/or does not unduly inhibit the provision of services in the network 300.

In some examples, such as that shown in FIG. 6, the determination of whether the first set of characteristics 402 is inconsistent with the second set of characteristics 504 may be performed prior to a comparison of the confidence score 404 with the threshold confidence score 112. In this case, determining that the first set of characteristics 402 are consistent with the second set of characteristics 504 may be sufficient for determining that the service advertisement message 502 should be forwarded into the network 300. In other examples, these steps may be performed simultaneously, or in a different order.

While the service advertisement message 502 may be forwarded into the network 300 in the circumstances described above, in some cases additional measures may be taken to mitigate risks when forwarding the service advertisement messages 502 into the network 300. For example, when the first set of characteristics 402 are inconsistent with the second set of characteristics 504 but the confidence score 404 is below the threshold confidence score 112, forwarding the message 502 may be subject to administrator approval. Additionally, or alternatively, the service advertisement message 502 may be forwarded along with a warning message that indicates that the first set of characteristics 402 are inconsistent with the second set of characteristics 504, thereby enabling different devices to handle the service advertisement message 502 based on their own security protocols.

Rejecting 602B the service advertisement message 502 and preventing it from being forwarded into the network 300 may be performed in response to a determination 208 that the first set of characteristics 402 are inconsistent with the second set of characteristics 504 and the confidence score 404 exceeds the threshold confidence score 112. The term "exceeds" is used here to imply that the confidence score represents a confidence that is above a threshold confidence, and/or satisfies respective conditions such that the decision to reject the service advertisement message 502 can be made. It is to be appreciated that the confidence scores 404 may be configured differently, such that a lower confidence score indicates a greater level of confidence. If this is the case, the treatment of confidence scores 404 that exceed, or do not exceed, the threshold confidence score 112 will be reversed compared to the treatment generally described throughout the present disclosure.

In the examples shown in FIG. 6, it can be seen that the first set of characteristics 402 for the device having ID "A" are inconsistent with the second set of characteristics 504 in the service advertisement message 502. Additionally, the confidence score 404 for the first set of characteristics 402 is greater than the threshold confidence score 112, meaning that the network device 100 is confident that the first set of characteristics 402 are accurate. In this case, the service advertisement message 502 is rejected.

Figure 7:
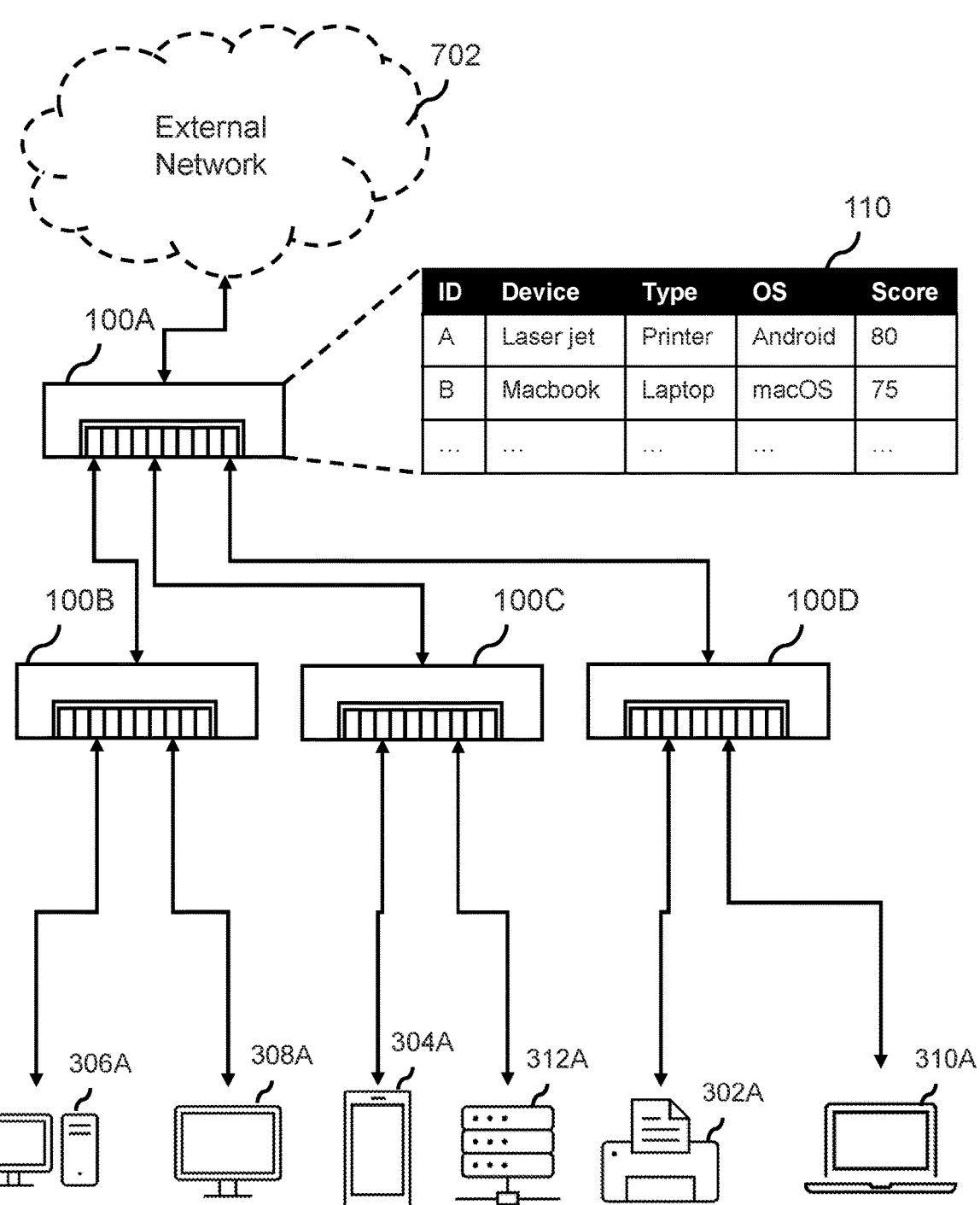
FIG. 7 is a schematic diagram showing an example of the method in which a network device is configured to generate the fingerprint data.

As mentioned above, in a first example, obtaining 202 the fingerprint data 110 includes receiving the fingerprint data 110 from a further device attached to the network 300 that is configured to generate the fingerprint data 110. In a second example, obtaining the fingerprint data 110 may include generating fingerprint data 110 in the network device 100. In other words, the network device 100 maybe configured to both generate the fingerprint data 110 and to implement the method 20 for controlling the distribution of service advertisement messages 502. FIG. 7 shows an example in which a first network device 100A is configured to generate the fingerprint data 110 and is in communication with three further network devices 100B to 100D that are configured to receive fingerprint data 110 from the first network device 100A. The first network device 100A in this example may also act as a network gateway, providing access to one or more further networks 702, including wide area networks such as the internet.

In this example, generating the fingerprint data 110 may include deriving the first set of characteristics from one or more messages received from the device 302A. The method 200 may involve at least one of: (i) performing passive scans of devices 302A to 312A attached to the network 300 to obtain messages from said devices 302A to 312A, and (ii) performing active scans of the devices 302A to 312A attached to the network 300 to obtain messages from said devices 302A to 312A. A passive scan may involve listening to messages which are transmitted from the respective devices 302A to 312A during normal operation such as when joining the network, interacting with other devices in the network, requesting authentication and so forth. Active scans may involve the network device 100 actively sending messages to the respective devices 302A to 312A to illicit a response message.

In the example shown in FIG. 7, the first network device 100A transmits the fingerprint data 110 to the other network devices 100B to 100D such that they do not need to generate their own fingerprint data 110. Generating the fingerprint data 110 may require coordinating and processing messages received from all of the devices connected to different network devices 100B and 100D hence generating the fingerprint data 110 centrally in the network device 100A may mitigate an increase in network traffic or administrative burden that would otherwise be places on the other network device 100B to 100D.

The network device 100 may be configured to process Dynamic Host Configuration Protocol (DHCP) messages and Hyper Text Transfer Protocol (HTTP) user agents from the devices 302A to 312A. For example, DHCP Option 55, 60, and the hostname provided in the DHCP message may be used to determine first set of characteristics 402 to be included in the fingerprint data 110. In particular a response to Option 60 DHCP may provide an indication of an operating system, and a respective version of said operating system being used on the device. While HTTP user agents may provide information indicating software and plugins running on the device. The hostname may include information identifying a device model or name which can be used, for example, based on a lookup, to identify a device model and/or type.

Where passive scans are used to generate the fingerprint data 110, the network device 100A may be configured to continuously monitor network traffic to identify characteristics of the devices 302A to 312A. The network device 100A may additionally request that other network devices 100B to 100D forward network traffic from one or more of the devices 302A to 312A to generate the fingerprint data 110. Where active scans are performed, these may be performed at regular intervals, e.g. periodically, or may be performed in response to triggers in the network such as the addition of new user devices, an instruction from an administrator, and so forth.

The fingerprint data 110 may evolve over time as more messages are monitored and/or further passive and active scans are performed. At an initial point in time, such as on deployment of the network device 100A, there may be little information available regarding the device 302A to 312A. Over time as more messages are received from the devices 302A and 312A, and passive and active scans are performed, the fingerprint data 110 may be progressively generated.

When generating the fingerprint data 110, the confidence score 404 for a given first set of characteristics 402 may be determined based on a variety of measures. In a first measure, an amount of data received in the messages from the device 302A that are used to derive the first set of characteristics may be used to determine the confidence score. For example, where a large amount of data is collected, such as included in several messages, and said data is internally consistent, then the confidence score 404 may be higher. Where a large amount of data is received from the device 302A and said data consistently implies a given characteristic it may be more likely that this given characteristic of said device 302A is an accurate characteristic. If a smaller amount of data is collected and used to derive the first set of characteristics 402, then the confidence score 404 may be lower as it is easier for a fraudulent or malicious device to replicate smaller amounts of data that imply this characteristic.

Additionally, or alternatively, a number of messages used to derive the first set of characteristics 402 may also be used determine the confidence score 404. Where a device 302A is continually sending messages, for example, over an extended period of time, that consistently identify the first set of characteristics 402 then it may be more likely that said first set of characteristics 402 are correct.

In some cases, the first set of characteristics 402 may be explicitly signaled in the messages from the device 302A and in other cases some or all of the first set of characteristics may be inferred based on data included in the messages. This will be dependent on the type of messages being processed to derive the first set of characteristics 402. Whether characteristics of the first set of characteristics 402 are inferred from the messages or explicitly signaled may be used to determine the confidence score 404. For example, characteristics which are inferred may be associated with a lower confidence level than characteristics that are explicitly signaled in messages from a device 302A.

The total number of characteristics included in the first set of characteristics may also influence the confidence score 404. Where the first set of characteristics 402 includes a large number of characteristics there may be greater confidence than in cases where there are few characteristics in the first set of characteristics 402.

The type of messages received from the device 302A, and used to derive the first set of characteristics, may be used to determine the confidence score. For example, some messages may be associated with a higher confidence level than other messages. This may be based on intrinsic characteristics of the messages, such as where they are of a specific type which is difficult to replicate or spoof, and/or extrinsic characteristics such as the context in which they are generated, e.g. in response to a passive scan or an active scan.

Generating the confidence score may include an assessment of any one or more of these measures. In some cases, the method 200 may involve leveraging whichever of these constraints are available to the system to derive a confidence score. The value of the confidence score may be derived based on a weighted sum of a plurality of sub scores. For example, a sub score may be assigned according to an evaluation of any one or more of the measures described above and a weighted sum may be performed to derive the confidence score. The weighted sum may, in some cases, be a normalized weighted sum in which each measure that contributes to the confidence score is weighted equally. In other examples, an initial value may be generated for the confidence score which is then modified based on an evaluation of any one or more of the measures described above.

Determining 208 whether there are inconsistencies between the first set of characteristics 402 and the second set of characteristics 504 for the device 302A may involve comparing a first characteristic of the first set of characteristics 402, the first characteristic corresponding to a first characteristic type, e.g. device type, with a second characteristic of the second set of characteristics 504, the second characteristic corresponding to the first characteristic type. Turning back to the example of FIG. 6, this may include comparing the "device type" for the device 302A having ID "A" represented in the fingerprint data 110, in this case "printer", with the "device type" for the device 302A having ID "A" represented in the service advertisement message 502 provided by the device 302A, in this case "WAN access point". In this case, the network device 100 is able to determine that "printer" is inconsistent with "WAN access point". The network device 100 will subsequently compare the confidence score 404 for this device 302A in the fingerprint data 110 and determine which predetermined action 602B or 602C to perform.

Additionally, or alternatively, determining 208 whether there are inconsistencies between the first set of characteristics and the second set of characteristics may involve comparing a first characteristic of the first characteristic type, e.g device type, with a second characteristic of the second set of characteristics, the second characteristic corresponding to a second, different, characteristic type, e.g. the services provided by said device. Turning again to FIG. 6, this process may include comparing a first characteristic such as "printer" which is a "device type" characteristic with a second characteristic, such as "IP Services" of a different type, in this case "Services", in the second set of characteristics. In this case the network device 100 may determine that a printer is unlikely to offer services such as IP services, or authentication, to other user devices in the network 300, hence these two characteristics are inconsistent. In other words, the network device 100 may compare different types of characteristics in the first set of characteristics 402 and the second set of characteristics 504 and may determine whether they are inconsistent. The network device 100 may store a set of rules, not shown, which describe inconsistencies between different characteristic types. For example, printer devices may be defined as being inconsistent with certain operating systems, and/or certain device types, such as printers, may be inconsistent with certain device models such as models generally known to be phones or laptops, and so forth.

As discussed above, the fingerprint data 110 may not include the same first set of characteristics for each device in the network 300 as the characteristics which can be determined will be dependent on the messages that are monitored from the devices 302A to 312A. Hence the network device 100 will not always have the same characteristics available to compare with the second set of characteristics 504. As such, being able to compare different types of characteristics enables the method to operate even in circumstances in which a reduced number of the first set of characteristics 402 are available.

While the examples described above involve the use of a single confidence score for each device represented in the fingerprint data 110, it will be appreciated that the fingerprint data 110 may comprise a plurality of confidence scores for each device. For example, each confidence score may correspond to one or more of the first set of characteristics 402. In this way, if the inconsistency relates to an inconsistency between a specific characteristics that has a high confidence score then the network device may reject the service advertisement message. Whereas in examples where the inconsistency between the first 402 and second 504 sets of characteristics relates to a characteristic that is associated with a low confidence score, e.g. below the threshold confidence score 112, then the service advertisement message 502 may be accepted and forwarded into the network 300. Providing this more granular treatment of the confidence in the first set of characteristics 402 represented in the fingerprint data 110, further increases the accuracy of identifying malicious and legitimate service advertisement messages 502 and handling them appropriately.

The methods of generating the fingerprint data 110 may be performed continuously, such that the confidence scores 404 and first sets of characteristics 402 are continually generated and/or updated. In this way, as device characteristics change, such as where the operating system of a device 302A is updated, the fingerprint data 110 can include an up-to-date copy of the first set of characteristics 402. In some examples, the confidence score may be dependent on a time elapsed since the first set of characteristics 402 were determined. When a first set of characteristics 402 are first determined, they may be associated with a confidence score 404 as described above. As time elapses, the confidence score 404 may be reduced as a function of the amount of time that has elapsed since the first set of characteristics 402 were determined. In this way, the confidence score 404 may account for potential changes in the first set of characteristics 402 that can occur over time as a device changes.

FIG. 8 shows an example of a non-transitory computer-readable storage medium 800 comprising computer-executable instructions 802 to 810 which, when executed by one or more processor 812, cause the processor to perform a method 200 as described above. The instructions include an instruction 802 to obtain 202 device fingerprint data 110 representing a first set of characteristics 402 of a device 302A connected to the network 300 and an associated confidence score 404 representative of a confidence in the first set of characteristics 402; an instruction 804 to obtain 204 a threshold confidence score 112 representing a threshold confidence for the first set of characteristics 402; an instruction 806 to receive 206 a service advertisement message 502 from the device 302A, the service advertisement message 502 including an indication of a second set of characteristics 504 of the device 302A; an instruction 808 determine 208 whether the first set of characteristics 402 are inconsistent with the second set of characteristics 504; and an instruction 810 perform 210 a predetermined action 602A to 602C in dependence on an outcome of the determining whether the first set of characteristics 402 are inconsistent with the second set of characteristics 504 and on a comparison of the confidence score 404 with the threshold confidence score 112.

According to the above described examples it is possible to the monitor the service advertisement messages 502 which are to be broadcast to a network 300 and to apply a security provision that can reject these advertisement messages 502 if it is determined that the broadcasting device is representing its characteristics as being different to those determined by a fingerprinting process and in which there is sufficient confidence in the characteristics determined from fingerprinting process. Thereby, it becomes possible to more accurately identify and reject fraudulent or malicious service advertisement messages while mitigating a risk that network performance is affected by inhibiting legitimate service advertisement messages 502 from being distributed in the network.

It is to be understood that any feature described in relation to any one example may be used alone, or in combination with other features described, and may also be used in combination with one or more features of any other of the examples, or any combination of any other of the examples. Furthermore, equivalents and modifications not described or shown in the accompanying figures above may also be employed without departing from the scope of the invention, which is defined in the accompanying claims. For example, while the threshold confidence score 112 has been described as a value read from storage 104 or provided by an external device, it is to be appreciated that the threshold confidence score 112 may be a changeable variable. For example, the network device 100 may monitor activity in the network and if it is determined that legitimate service advertisement messages are being rejected and/or that fraudulent service advertisement messages are being accepted, the threshold confidence score 112 may be modified to increase the accuracy of the method in successfully rejecting malicious advertisements and accepting legitimate advertisements.

What is claimed is:

1. A computer-implemented method for controlling a network, the method comprising:

obtaining device fingerprint data representing a first set of characteristics of a device connected to the network and an associated confidence score representative of a confidence in the first set of characteristics;

obtaining a threshold confidence score representing a threshold confidence for the first set of characteristics;

receiving a service advertisement message from the device, the service advertisement message including an indication of a second set of characteristics of the device;

determining whether the first set of characteristics are inconsistent with the second set of characteristics, the determining comprising comparing:

a first characteristic of the first set of characteristics, the first characteristic corresponding to a first characteristic type, with a second characteristic of the second set of characteristics, the second characteristic corresponding to a second, different, characteristic type, wherein the comparing takes account of a set of rules describing one or more inconsistencies between the first characteristic type and the second characteristic type; and performing a predetermined action in dependence on an outcome of the determining whether the first set of characteristics are inconsistent with the second set of characteristics and on a comparison of the confidence score with the threshold confidence score, wherein the confidence score associated with the fingerprint data is dependent on a time elapsed since the first set of characteristics were determined.

2. The computer-implemented method of claim 1, wherein the predetermined action includes:

forwarding the service advertisement message into the network; or rejecting the service advertisement message to prevent the service advertisement message from being distributed in the network.

3. The computer-implemented method of claim 2, wherein forwarding the service advertisement message into the network is dependent on at least one the following conditions being met:

the first set of characteristics are consistent with the second set of characteristics and the confidence score represented in the fingerprint data does not exceed the threshold confidence score;

the first set of characteristics are consistent with the second set of characteristics and the confidence score represented in the fingerprint data exceeds the threshold confidence score; and the first set of characteristics are inconsistent with the second set of characteristics and the confidence score represented in the fingerprint data does not exceed the threshold confidence score.

4. The computer-implemented method of claim 3, wherein forwarding the service advertisement message when the first set of characteristics are inconsistent with the second set of characteristics and the confidence score does not exceed the threshold confidence score is subject to administrator approval.

5. The computer-implemented method of claim 2, wherein rejecting the service advertisement message to prevent the service advertisement message from being distributed in the network is performed in response to a determination that the first set of characteristics are inconsistent with the second set of characteristics and the confidence score represented in the fingerprint data exceeds the threshold score.

6. The computer-implemented method of claim 1, wherein obtaining the fingerprint data includes receiving the fingerprint data from a further device attached to the network that is configured to generate the fingerprint data.

7. The computer-implemented method of claim 1, wherein obtaining the fingerprint data includes generating the fingerprint data.

8. The computer-implemented method of claim 7, wherein generating the device fingerprint data includes deriving the first set of characteristics from one or more messages received from the device, and wherein the method includes at least one of:

performing passive scans of devices attached to the network to obtain messages from said devices; and performing active scans of the devices attached to the network to obtain messages from said devices.

9. The computer-implemented method of claim 8, wherein the confidence score is determined based on at least one of the following:

an amount of data received in messages from the device that are used to derive the first set of characteristics;

a number of messages used to derive the first set of characteristics;

whether characteristics of the first set of characteristics are inferred from the messages or explicitly signaled in the messages;

a number of characteristics included in the first set of characteristics; and the type of messages received from the device.

10. The computer-implemented method of claim 1, wherein the first and second set of characteristics each include at least one of:

a device type;

an operating system;

an indication of software running on the device;

a device model;

an identification number associated with the device; and an indication of services provided by the device.

11. A network device configured to act as an access point for devices to connect to a network, the network device comprising a processor and storage, the storage comprising executable instructions which, when executed by the processor, cause the network device to:

obtain device fingerprint data representing a first set of characteristics of a device connected to the network and an associated confidence score representative of a confidence in the first set of characteristics;

obtain a threshold confidence score representing a threshold confidence for the first set of characteristics;

receive a service advertisement message from the device, the service advertisement message including an indication of a second set of characteristics of the device;

determine whether the first set of characteristics are inconsistent with the second set of characteristics by comparing:

a first characteristic of the first set of characteristics, the first characteristic corresponding to a first characteristic type, with a second characteristic of the second set of characteristics, the second characteristic corresponding to a second, different, characteristic type, wherein the comparing takes account of a set of rules describing one or more inconsistencies between the first characteristic type and the second characteristic type; and perform a predetermined action in dependence on an outcome of the determining whether the first set of characteristics are inconsistent with the second set of characteristics and on a comparison of the confidence score with the threshold confidence score, wherein the confidence score associated with the fingerprint data is dependent on a time elapsed since the first set of characteristics were determined.

12. The network device according to claim 11, wherein the predetermined action includes:

forwarding the service advertisement message into the network; or rejecting the service advertisement message to prevent the service advertisement message from being distributed in the network.

13. The network device according to claim 12, wherein forwarding the service advertisement message into the network is dependent on at least one of the following conditions being met:

the first set of characteristics are consistent with the second set of characteristics and the confidence score represented in the fingerprint data does not exceed the threshold confidence score;

the first set of characteristics are consistent with the second set of characteristics and the confidence score represented in the fingerprint data exceeds the threshold confidence score; and the first set of characteristics are inconsistent with the second set of characteristics and the confidence score represented in the fingerprint data does not exceed the threshold confidence score.

14. The network device according to claim 12, wherein rejecting the service advertisement message to prevent the service advertisement message from being distributed in the network is performed in response to a determination that the first set of characteristics are inconsistent with the second set of characteristics and the confidence score represented in the fingerprint data exceeds the threshold confidence score.

15. The network device according to claim 11, wherein obtaining the fingerprint data includes generated the fingerprint data by deriving the first set of characteristics from one or more messages received from the device, and wherein the instructions, when executed by the processor, cause the network device to perform at least one of the following:

passive scans of devices attached to the network to obtain messages from said devices; and active scans of devices attached to the network to obtain messages from said devices.

16. The network device according to claim 15, wherein the confidence score is determined based on at least one of the following:

an amount of data received in messages from the device that are used to derive the first set of characteristics;

a number of messages used to derive the first set of characteristics;

whether characteristics of the first set of characteristics are inferred from the messages or explicitly signaled in the messages; and the type of messages received from the device.

17. The network device according to claim 11, wherein the first and second set of characteristics each include at least one of:

a device type;

an operating system;

an indication of software running on the device;

a device model;

an identification number associated with the device;

port information corresponding to the device; and an indication of services provided by the device.

18. A non-transitory computer-readable storage medium comprising computer-executable instructions which, when executed by a processor, cause the processor to:

obtain device fingerprint data representing a first set of characteristics of a device connected to the network and an associated confidence score representative of a confidence in the first set of characteristics;

obtain a threshold confidence score representing a threshold confidence for the first set of characteristics;

receive a service advertisement message from the device, the service advertisement message including an indication of a second set of characteristics of the device;

determine whether the first set of characteristics are inconsistent with the second set of characteristics by comparing:

a first characteristic of the first set of characteristics, the first characteristic corresponding to a first characteristic type, with a second characteristic of the second set of characteristics, the second characteristic corresponding to a second, different, characteristic type, wherein the comparing takes account of a set of rules describing one or more inconsistencies between the first characteristic type and the second characteristic type; and perform a predetermined action in dependence on an outcome of the determining whether the first set of characteristics are inconsistent with the second set of characteristics and on a comparison of the confidence score with the threshold confidence score, wherein the confidence score associated with the fingerprint data is dependent on a time elapsed since the first set of characteristics were determined.

* * * * *